United States Patent
Dahan et al.

(10) Patent No.: US 9,843,913 B2
(45) Date of Patent: Dec. 12, 2017

(54) E911 CALL CONTINUITY FOR WIFI OFFLOAD

(71) Applicant: AT&T Intellectual Property I, L.P., Atlanta, GA (US)

(72) Inventors: Joseph Dahan, Redmond, WA (US); Michal Cwian, Kirkland, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 14/738,220

(22) Filed: Jun. 12, 2015

(65) Prior Publication Data
US 2016/0366574 A1    Dec. 15, 2016

(51) Int. Cl.
| H04M 11/04 | (2006.01) |
| H04W 4/22 | (2009.01) |
| H04W 76/00 | (2009.01) |
| H04W 36/00 | (2009.01) |
| H04W 36/14 | (2009.01) |
| H04W 84/12 | (2009.01) |

(52) U.S. Cl.
CPC .......... *H04W 4/22* (2013.01); *H04W 36/0011* (2013.01); *H04W 76/007* (2013.01); *H04W 36/14* (2013.01); *H04W 84/12* (2013.01)

(58) Field of Classification Search
CPC ..... H04W 4/22; H04W 76/007; H04W 36/14; H04W 84/12
USPC ..................................................... 455/404.1
See application file for complete search history.

(56) References Cited

U.S. PATENT DOCUMENTS

| 8,195,778 | B1 | 6/2012 | Leung et al. |
| 8,351,951 | B2 | 1/2013 | Hsieh et al. |
| 8,433,282 | B2 | 4/2013 | You et al. |
| 8,582,529 | B2 | 11/2013 | Shaheen |
| 8,630,607 | B2 | 1/2014 | Shaikh |
| 8,755,766 | B2 | 6/2014 | Liao |
| 8,792,453 | B2 | 7/2014 | Bachmann et al. |
| 8,855,594 | B2 | 10/2014 | Suh et al. |
| 8,885,612 | B2 | 11/2014 | Aramoto et al. |
| 8,964,695 | B2 | 2/2015 | Bachmann et al. |
| 2007/0149166 | A1* | 6/2007 | Turcotte ................ H04W 4/22 455/404.1 |
| 2011/0230162 | A1 | 9/2011 | Mutikainen |
| 2012/0269167 | A1 | 10/2012 | Velev et al. |
| 2014/0198637 | A1* | 7/2014 | Shan .................. H04W 52/243 370/229 |
| 2015/0003415 | A1 | 1/2015 | Muley et al. |
| 2016/0295385 | A1* | 10/2016 | Wang ..................... H04W 4/22 |

FOREIGN PATENT DOCUMENTS

CN        101938728 A    *    1/2011

* cited by examiner

*Primary Examiner* — Amancio Gonzalez
(74) *Attorney, Agent, or Firm* — Baker & Hostetler LLP

(57) ABSTRACT

A system and method for transferring e911 calls between a 3GPP network and a non-3GPP network. The method includes connecting an emergency communication between a mobile device and an emergency service, receiving, from the mobile device, an indication to handoff the communication from a first network to a second network; and transferring the communication from the first network to the second network while maintaining continuity of the communication.

14 Claims, 18 Drawing Sheets

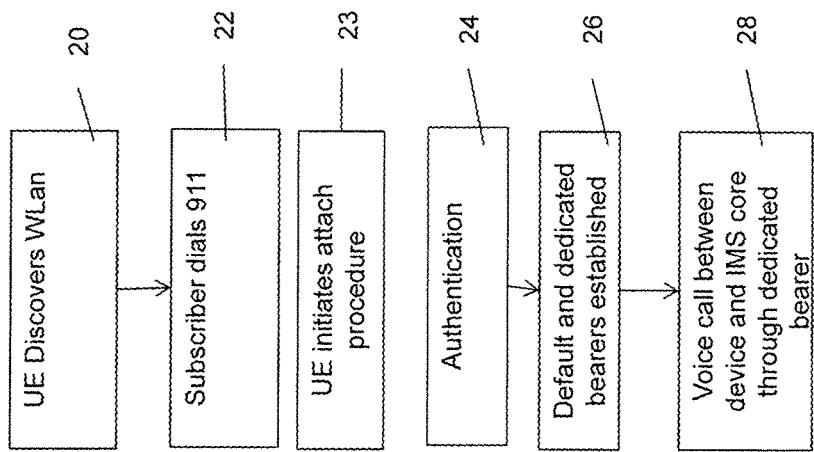

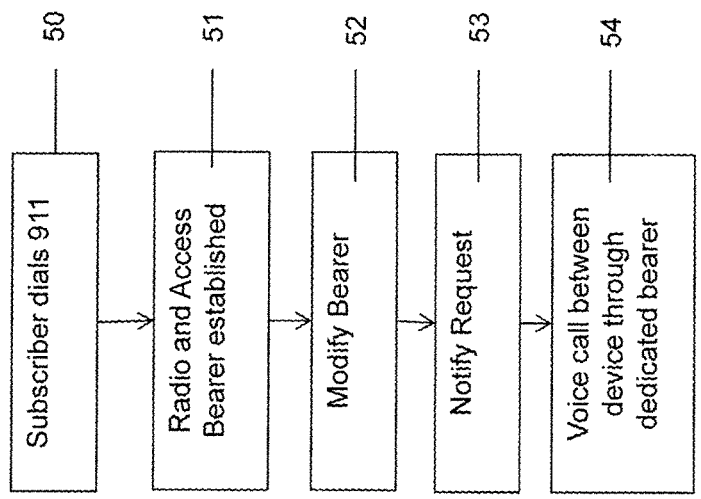

E911 CALL CONTINUITY FOR WIFI OFFLOAD

TECHNICAL FIELD

The technical field generally relates to telecommunications, and more specifically to a method for maintaining continuity in an emergency call between 3GPP and non-3GPP network types.

BACKGROUND

Recently there has been a propagation of calls using Voice over Long Term Evolution (VOLTE) standards. That, combined with the continued increase in cellular network telecommunications traffic, has incentivized some service providers to offer calling through WiFi connections in accordance with the various IEEE 802.11 standards. Such WiFi offloading, as it is called, enables telecommunications calls and data from a mobile device to be offloaded from the cellular network to the internet for transport from the mobile device to the termination destination point and vice versa. Such WiFi networks may be either generally secure, operator controlled networks, known as trusted networks, or generally unsecured, publicly accessible WiFi networks through public hotspots and the like, known as untrusted networks.

Call continuity between trusted/untrusted WiFi networks and Long Term Evolution (LTE) networks is provided for in the various 3GPP specifications. VOLTE governs the movement of mobile devices between the WiFi and LTE networks with a call in progress.

However, the same flexibility in moving between WiFi and LTE networks does not currently exist for emergency calls. There is a need to provide a similar calling experience for users making emergency calls.

SUMMARY

The present disclosure includes a telecommunications system having a controller; and a memory coupled to the controller, the memory including executable instructions that when executed by the controller, cause the controller to effectuate operations including: connecting an emergency communication between a mobile device and an emergency service, receiving, from the mobile device, an indication to handoff the communication from a first network to a second network, and transferring the communication from the first network to the second network while maintaining continuity of the communication. The system includes a first network being a non-3GPP network and the second network being a 3GPP network and, wherein the connecting step includes receiving an attach request with an emergency handoff command from the mobile device. The transferring step may further include receiving, by the processor, an attach request to a 3GPP network from the mobile device, creating a second bearer in the 3GPP network, and transferring the communication to the created bearers.

The present disclosure also includes a system wherein the first network is a 3GPP network and the second network is a non-3GPP network and wherein the connecting step includes a request type indicating emergency and wherein the connecting step may further include updating a home subscriber service server with an updated packet gateway identification for an emergency access point name. The transferring step may further include retrieving the updated packet gateway identification, selecting a packet gateway based on the retrieving step, creating a second bearer and transferring the communication to the second bearer.

The present disclosure is also direct to a method including connecting an emergency communication between a mobile device and an emergency service, receiving, from the mobile device, an indication to handoff the communication from a first network to a second network, and transferring the communication from the first network to the second network while maintaining continuity of the communication. The method includes wherein the first network is a non-3GPP network and the second network is a 3GPP network and wherein the connecting step includes receiving an attach request with handoff command from the mobile device. The transferring step may further include receiving, by the processor, an attach request to a 3GPP network from the mobile device, creating a second bearer in the 3GPP network; and transferring the communication to the created bearers. The method also includes wherein the first network is a 3GPP network and the second network is a non-3GPP network and wherein the connecting step includes a request type indicating emergency. The connecting step may further include updating a home subscriber service server with an updated packet gateway identification for an emergency access point name and the transferring step may further include retrieving the updated packet gateway identification, selecting a packet gateway based on the retrieving step, creating a second bearer, and transferring the communication to the second bearer.

The disclosure is also directed to a mobile device that supports the functionality described herein. For example the disclosure also includes a mobile device capable of communicating on a non-3GPP network and a 3GPP network including a controller; and a memory coupled to the controller, the memory having executable instructions that when executed by the controller cause the controller to effectuate operations including initiating an emergency communication on the non-3GPP network with an attach request including an emergency handoff command, detecting the presence of a 3GPP network, and transferring the communication from the non-3GPP network to a 3GPP network while maintaining continuity of the communication. The transferring step may further include generating an attach request to a 3GPP network from the mobile device. requesting a second bearer in the 3GPP network; and transferring the communication to the created bearers.

BRIEF DESCRIPTION OF THE DRAWINGS

Aspects of the herein described telecommunications network are described more fully herein with reference to the accompanying drawings, in which example embodiments are shown. In the following description, for purposes of explanation, numerous specific details are set forth in order to provide an understanding of the various embodiments. However, the instant disclosure may be embodied in many different forms and should not be construed as limited to the example embodiments set forth herein. Like numbers refer to like elements throughout.

FIG. 2 is an example process flow diagram through which an e911 call may be placed over a WiFi network.

FIG. 4 is an example process flow diagram through which an e911 call may be placed over an LTE network.

DETAILED DESCRIPTION OF ILLUSTRATIVE EMBODIMENTS

Figure 1:
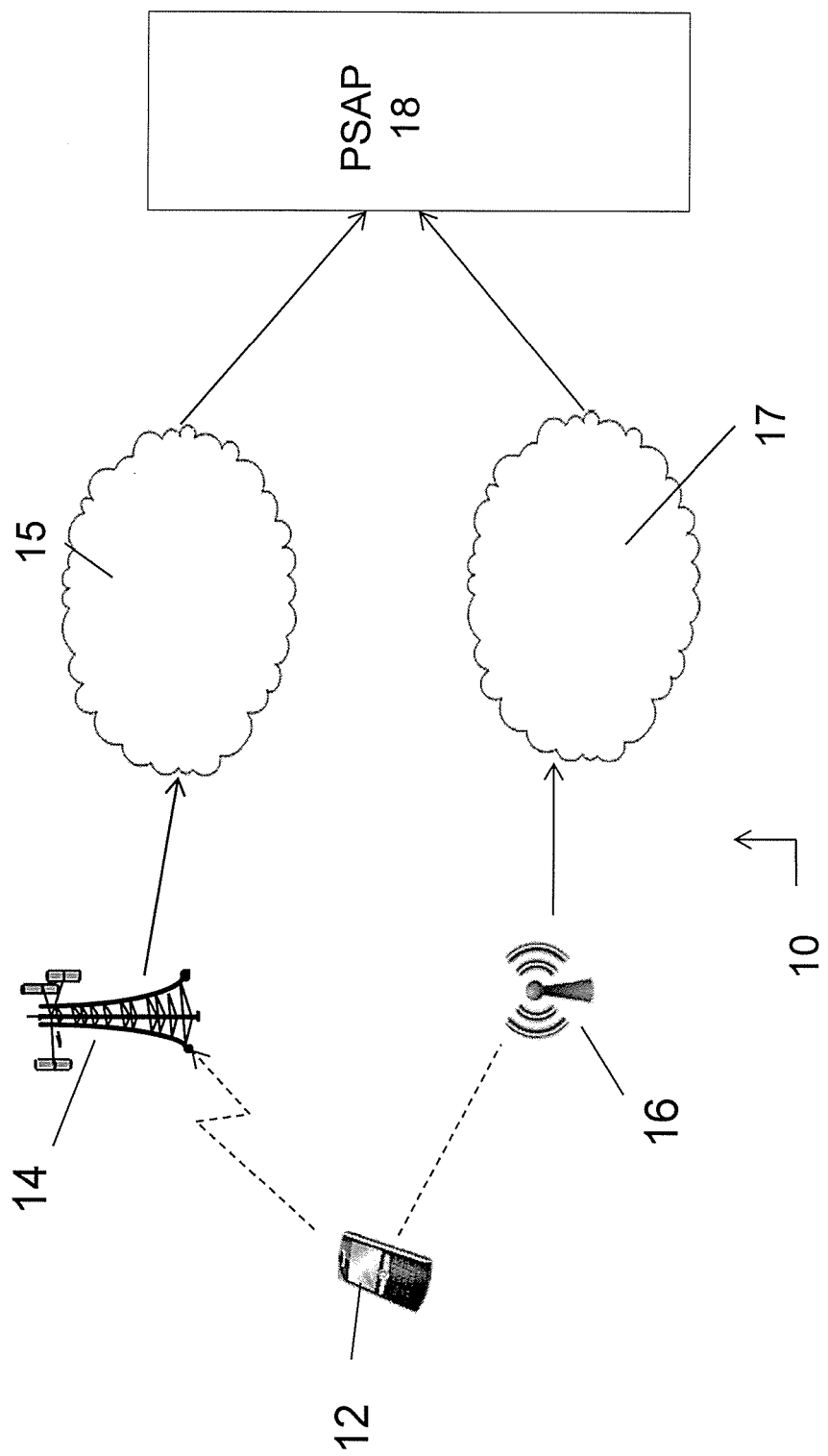
FIG. 1 illustrates an example telecommunication system wherein a user device may connect and communicate over LTE or through WiFi connectivity.

The disclosure herein describes a mechanism to allow emergency calls to continue when a registered User Equipment (UE) moves between 3GPP and non-3GPP technologies (Trusted/Untrusted WIFI) regardless of technology in which the call was originated. The 3GPP specifications currently do not provide support for such movement of emergency calls between networks. As shown in FIG. 1, UE 12 in the context of the present disclosure may comprise any appropriate type of user equipment, such as, for example, a tablet, a smart phone, or any type of user equipment capable of providing voice connectivity. It is to be understood that the user equipment 12 as depicted in FIG. 1 is exemplary and not intended to be limiting. In accordance with the present disclosure, the UE is registered on the relevant network.

Acronyms are used throughout the disclosure that will be understood by those skilled in the art.

The disclosure herein provides for the creation of a new attach request type, which may, for example, force the mobility management entity (MME) and evolved Packet Data Gateway (ePDG) or other network equipment to consult the home subscriber server (HSS) when an emergency call is being handed over to them and then to route the UE towards the proper PDN Gateway (PGW) during handover in order to continue to use existing bearers for a particular UE.

FIG. 1 illustrates an example telecommunication system 10 including UE 12 which may communicate through a cellular network 15 (i.e., LTE, 5G, etc.) via a macro cell 14 or a WiFi infrastructure 17 through a WiFi access point 16 to a Public Safety Access Point (PSAP) 18. UE 12 may gain initial access to either network 28 via any appropriate mechanism. It is to be understood that the telecommunications system 10 as depicted in FIG. 1 is exemplary and not intended to be limiting. It should be noted that while the present disclosure will be described in terms of LTE and WiFi networks, including trusted and untrusted WiFi networks, the disclosure is intended to be broader than those two networks. As such, LTE may be referred to herein as 3GPP networks and WiFi may also be referred to herein as non-3GPP networks. Other figures, including FIGS. 9 through 16, provide additional details of exemplary networks.

In the description of the various flow diagrams that follow, certain commands are used to illustrate the exemplary flows. It should be noted that any commands set forth herein are exemplary only and are not intended to limit the scope of the disclosure or the appended claims.

FIG. 2 depicts a process flow in which a UE 12 will place a call using a WiFi infrastructure 17. Generally, a subscriber using a UE 12 will discover a WiFi access point and at step 20. At step 22, the UE 12 the user dials "911". At step 23, the UE initiates an attach procedure. At step 24, the access authentication procedure is performed. At the point (not shown) the ePDG selects the PGW. The ePDG sends a Create Session Request (S2b) message with the Handover Indication (HI) bit set to 0 (Initial Attach) to allow the PGW to allocate a new IP prefix to be used by the UE 12 to access the emergency access point name (APN). The PGW sends an AAR (S6b) message to the HSS to update the PGW identity in the HSS for the emergency APN. This also establishes a Diameter session between the PGW and the HSS that remains until the WiFi access to the emergency APN is released. The HSS may also send authentication messages to acknowledge receipt of the PGW identity. HSS shall store the selected PGW info and inform the MME if the UE was registered previously in the 3GPP network access. The PGW accepts the session and sends Create Session Response (S2b) and returns the default bearer QoS, the UE IP prefix and the IP addresses of the primary and secondary proxy-CSCF for emergency calls (E-CSCF). At step 26, default and dedicated bearers are established for the emergency APN per the 3GPP standards. A step 28, traffic for the voice call between the UE 12 and the IMS core through a dedicated bearer to the PSAP 18 will begin.

Figure 3A:
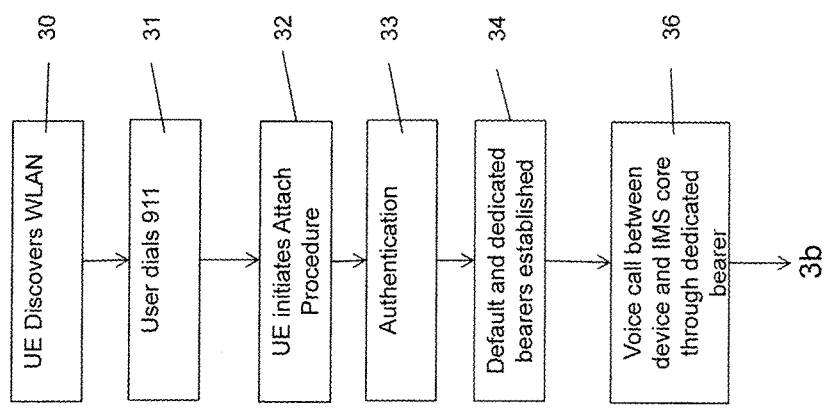
FIG. 3 is an example process flow diagram through which an e911 call originally placed over a WiFi network may be transitioned to an LTE network.
Figure 3B:
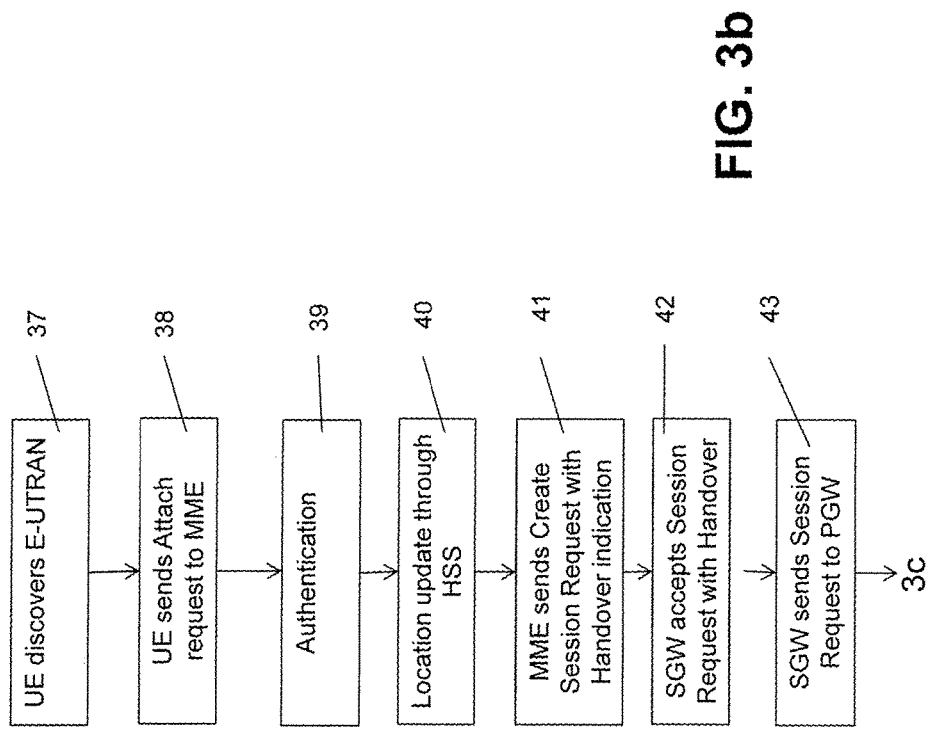
Figure 3C:
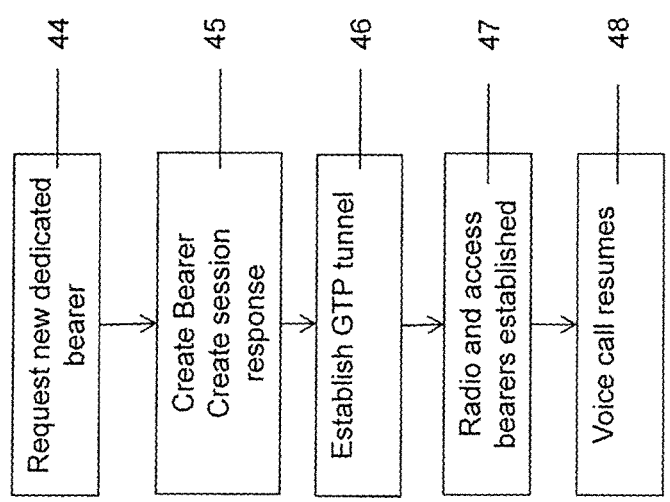

FIG. 3 comprises FIGS. 3a, 3b and 3c and, illustrates an example system and process for implementing a handoff of an e911 call from a WiFi network to an LTE network. With reference to FIG. 3a, at step 30, the UE detects the WiFi network in accordance with call processing logic as understood by those skilled in the art. At step 31, the subscriber using the UE 12 dials 911. At step 32, the UE attaches to the WiFi network. At step 33, the UE is authenticated on the WiFi network. At step 34, the default and dedicated bearers are established. At step 35, the voice call between the UE 12 to the PSAP 1 is established via the IMS core through the dedicated bearer.

Continuing with the process flow shown in FIG. 3*b*, at step 37, the UE 12 discovers access to an E-UTRAN and determines that it should transfer (or handoff) its current session from the currently used WiFi network to the LTE network through the E-UTRAN. At step 38, the UE sends an Attach Request to the MME with the Request Type indicating "Emergency Handover" Attach. The message from the UE is routed by the E-UTRAN to the MME. At step 39 the MME may contact the HSS and authenticate the UE. After successful authentication, at step 40, the MME may perform a location update procedure and the retrieve subscriber data from the HSS if the MME does not have the valid subscriber information about the selected PGW for emergency services. The MME may retrieve information about the selected PGW in WiFi access for emergency APN. The HSS may then acknowledge the Update Location message by returning an Update Location Acknowledge message. Since the Request Type is "Emergency Handover", the PDN GW identity conveyed to the MME by the HSS should be stored in the PDN subscription context. The MME receives information on the PDNs and the UE is correlated to the non-3GPP access in the Subscriber Data obtained from the HSS. The MME may store the PGW information also for the emergency APN.

At step 41, the MME sends a Create Session Request message which may include the IMSI, MME Context ID, PDN-GW address, Handover Indication, APN, and RAT Type to the selected Serving Gateway (SGW). Since the Request Type is "Emergency Handover", Handover Indication information may be included. At step 42, the SGW may process the message and send a Create Session Request with Handover Indication message to the PGW (at step 43). The PGW may accept the request with Handover Indication Flag and the emergency APN.

Continuing with FIG. 3*c*, the PDN GW and Policy Charging and enforcement Point (PCEF) determine that a bearer of the required QCI and ARP does not currently exist within the emergency session and at Step 44 requests that a new dedicated bearer be created by the PGW. At step 45, the PGW responds with combined Create Bearer Request and Create Session Response message sent to the SGW which message is also sent to the MME. The Create Session Response message may also contain the IP address or the prefix that was assigned to the UE while it was connected to the non-3GPP IP access. This message also serves as an indication to the MME that the S5 bearer setup and update has been successful. At step 46, the GPRS Tunneling Protocol (GTP) tunnel(s) over S5 are established. Radio and access bearers are established at step 47 for default and dedicated bearers. The MME may send a Modify Bearer Request which may include an eNodeB address, eNodeB TEID, and Handover Indication along with a Create Bearer Response message to the SGW and PGW to announce that the Radio Access Bearers (RABs) for default bearer and dedicated voice bearer have been created. The PDN GW acknowledges by sending Modify Bearer Response to the Serving GW and MME. SIP signaling is now possible on the emergency default bearer. At step 48 the voice call resumes flowing between the device and the IMS core. The Packet GW may then clean up the old session in the untrusted non-3GPP access.

Turning now to FIG. 4, there is shown an exemplary flow diagram illustrating the connection from a UE to a LTE network to place an e911 call. At step 50, the UE is attached to an E-UTRAN access and is IMS registered. At step 51, the UE dials "911" and sends a PDN Connectivity Request message to the MME with a Request Type indicating "Emergency". The message from the UE is routed by the E-UTRAN to the MME. The MME selects the PGW and sends a Create Session Request (emergency APN) message to the SGW. The Serving GW creates a new entry in its EPS Bearer table and sends a Create Session Request message to the PGW for further processing. The PGW responds with Create Session Response to SGW and later down to MME. The PDN connectivity for emergency default bearer is successfully established and acknowledged by UE. Radio and Access bearers are established at this step for the default bearer. The MME sends a Modify Bearer Request message which may include the eNodeB address, eNodeB TEID, and Handover Indication to the SGW and PGW to inform it that the Radio Access Bearers (RABs) for the default bearer have been created. The PDN GW acknowledges by sending a Modify Bearer Response message to the Serving GW and MME. The MME sends a Notify Request message to the HSS to update the PGW identity in the HSS for emergency APN. HSS should store the selected PGW info and inform the PDG if UE was registered previously in the non-3GPP network access. The HSS sends Notify acknowledge to acknowledge receipt of the PGW identity. Once the SIP connection is established, the IMS core and PGW initiate Create Bearer Request to establish a dedicated bearer through the SGW to MME. Radio and Access bearers are established at this step for dedicated bearer. The MME acknowledges successful dedicated bearer setup via Create Bearer Response for the call.

Figure 5:
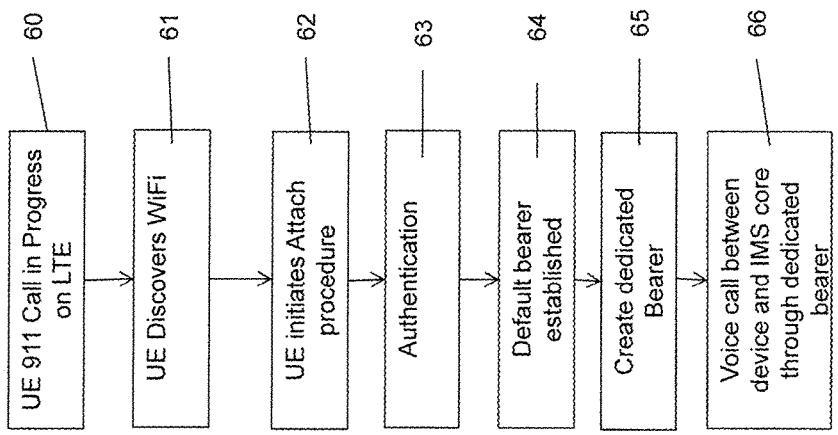
FIG. 5 is an example process flow diagram through which an e911 call originally placed over an LTE network may be transitioned to a WiFi network.

FIG. 5 illustrates the process flow to for an e911 call in progress to handoff the call from an LTE network to a call using a WiFi infrastructure. At step 60 the subscriber has ongoing "911" voice call. At step 61, the UE discovers a WiFi access point and initiates the handover procedure starting with 802.11 device authentication and the UE receives an ISP public IP address. The UE initiates the attach procedure at step 62. At step 63, the access authentication procedure between UE and the ePDG is performed. The UE indicates to the ePDG that an emergency handover is being performed. As part of the access authentication the PDN GW identity is sent to the ePDG by the 3GPP HSS server. This information may be stored in HSS after the UE initiated emergency call in E-UTRAN access. Based on information received from HSS, the ePDG selects the PGW to be used. The ePDG sends the Create Session Request message with the Handover Indication bit set to 1 (Handover) to allow the PGW to reallocate the existing IP prefix used by the UE to access the IMS services. The PGW accepts the new IP-CAN Session (S2b Create Session Response) and returns the default bearer, the UE IP prefix (unchanged from the IP prefix assigned for LTE access) in a Create Session Response message. The emergency APN IPSec tunnel is established between the UE and ePDG, as well as the GTP tunnel between the ePDG and the PGW for the emergency default bearer. The default bearer is established at step 64. The PDN GW and PCEF determine that the bearer does not currently exist within the emergency session and requests that a new dedicated bearer be created by the PGW. PGW sends Create Bearer Request (S2b) to the ePDG defining the bearer QoS. The ePDG notifies the PGW via Create Bearer Response (S2b) of the successful creation of the dedicated voice bearer at step 65. At step 66, traffic for the voice call begins flowing between the device and the IMS Core through dedicated bearer.

Figure 6:
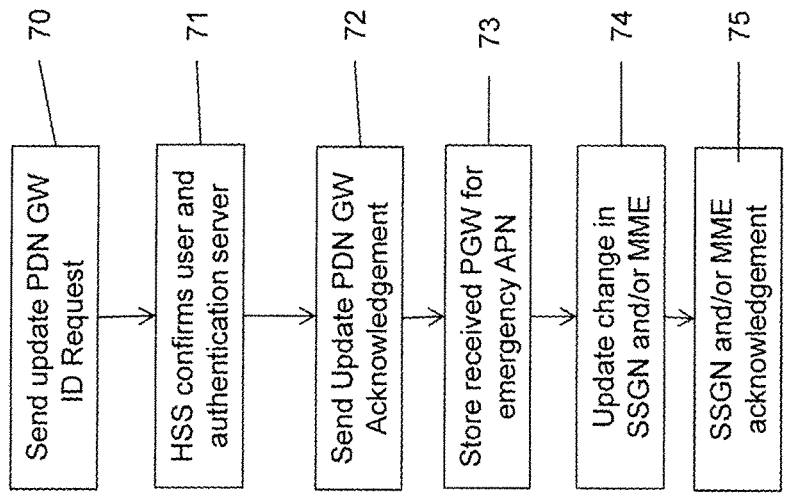
FIG. 6 is an example process flow diagram illustrating the flow for the emergency PDN gateway identify from the HSS/authentication server.

FIG. 6 illustrates an exemplary flow diagram which describes one method that the MME/ePDG are updated from the HSS. At step 70, the 3GPP Authentication Server sends an Update PDN GW Identity Request message (PDN GW Identity, emergency APN, and User Identity) to the HSS. At step 71, the HSS checks that the user is known and that the stored 3GPP authentication Server name is the currently registered 3GPP authentication server for this same user. If this is successful, at step 72 the HSS returns an Update PDN GW Identity Acknowledgement. HSS should store received PGW info for emergency APN at step 73. The HSS sends an Insert Subscriber Data message at step 74 to the SGSN or MME to update the change in the SGSN or MME. If both an SGSN and an MME are registered in the HSS, and then the Insert Subscriber Data message is sent to each of them. SGSN and MME should retain received info for emergency APN PGW. The SGSN or MME acknowledges by sending an Insert Subscriber Data Ack message at step 75.

Figure 7:
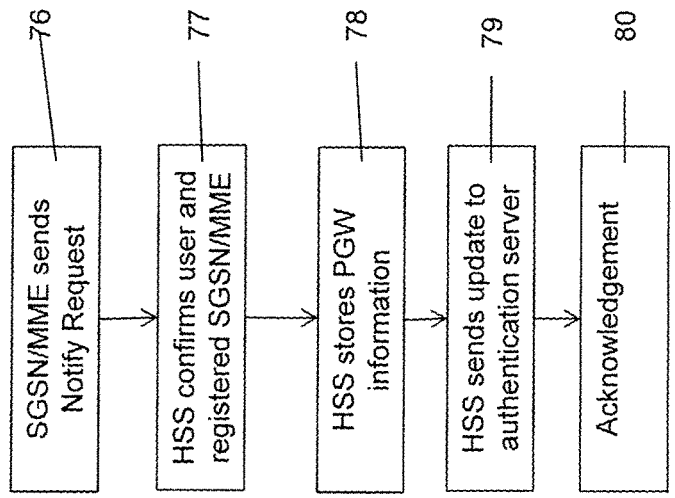
FIG. 7 is an example process flow diagram illustrating the flow for the emergency PDN gateway identity from the MME.

FIG. 7 illustrates an exemplary flow diagram which illustrates one method in which the emergency PDN GW Identity Notification is sent to the HSS from MME/SGSN. The SGSN/MME sends a Notify Request (emergency PDN GW Identity, APN, and User Identity) to the HSS at step 76. The HSS checks that the user is known and that the stored SGSN/MME is the currently registered SGSN/MME for this user at step 77. If this is successful, the HSS returns a Notify Response message. At step 78 the HSS stores the received PGW information for the emergency APN. At step 79 the HSS sends both an Update emergency APN and PDN GW identity Request messages to the 3GPP Authentication Server. The commands are acknowledged at step 80 in which the 3GPP authentication server acknowledges by sending an Update APN and PDN GW Identity Ack message. If network based mobility is used for establishing connectivity in the non-3GPP IP access, the 3GPP authentication server updates the ePDG trusted/non-3GPP IP access network with the new emergency APN and PGW Identity data by sending Update APN and PDN GW Identity messages. The ePDG or trusted/non-3GPP IP access network acknowledges by sending Update APN and PDN GW Identity Ack message.

Figure 8:
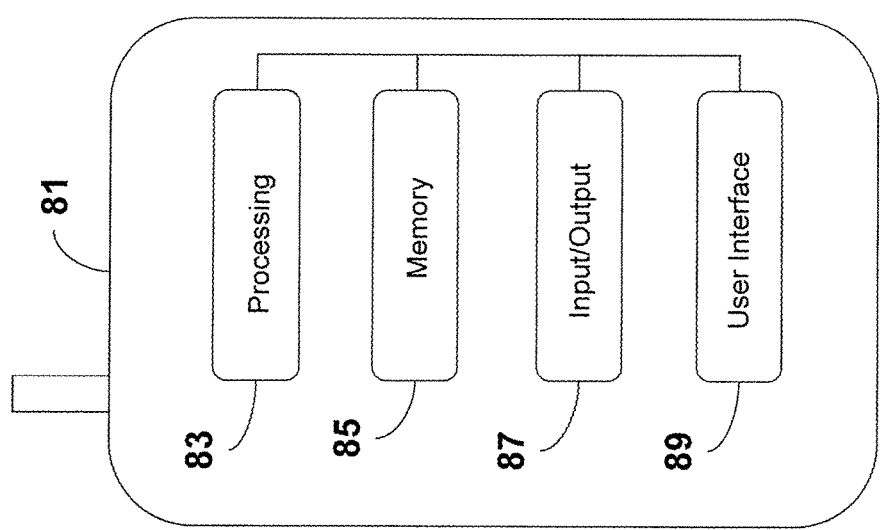
FIG. 8 is a block diagram of an example device that may be utilized with a telecommunication network wherein management and control are based, at least in part, on user equipment.

FIG. 8 is a block diagram of an example device 81 that may be utilized with a telecommunication network as described herein. The device 81 may comprise and/or be incorporated into any appropriate device, examples of which may include UE 32, UE 12, UE 14, UE 16, UE 18, a mobile device, a mobile communications device, a cellular phone, a portable computing device, such as a laptop, a personal digital assistant ("PDA"), a portable phone (e.g., a cell phone or the like, a smart phone, a video phone), a portable email device, a portable gaming device, a TV, a DVD player, portable media player, (e.g., a portable music player, such as an MP3 player, a Walkman, etc.), a portable navigation device (e.g., GPS compatible device, A-GPS compatible device, etc.), or a combination thereof. The device 81 can include devices that are not typically thought of as portable, such as, for example, a public computing device, a navigation device installed in-vehicle, a set top box, or the like. The mobile device 81 can include non-conventional computing devices, such as, for example, a kitchen appliance, a motor vehicle control (e.g., steering wheel), etc., or the like. As evident from the herein description, user equipment, a UE, a device, a communications device, or a mobile device is not to be construed as software per se.

The device 81 may include any appropriate device, mechanism, software, and/or hardware for communicating with a telecommunication network wherein management and control are based, at least in part, on user equipment, as described herein.

In an example embodiment, the device 81 may comprise a processor and memory coupled to the processor. The memory may comprise executable instructions that when executed by the processor cause the processor to effectuate operations associated with a telecommunication network wherein management and control are based, at least in part, on user equipment, as described herein.

In an example configuration, the device 81 may comprise a processing portion 83, a memory portion 85, an input/output portion 87, and a user interface (UI) portion 89. Each portion of the device 81 may comprise circuitry for performing functions associated with each respective portion. Thus, each portion may comprise hardware, or a combination of hardware and software. Accordingly, each portion of the device 81 is not to be construed as software per se. It is emphasized that the block diagram depiction of device 81 is exemplary and not intended to imply a specific implementation and/or configuration. For example, in an example configuration, the device 81 may comprise a cellular communications technology and the processing portion 83 and/or the memory portion 85 may be implemented, in part or in total, on a subscriber identity module (SIM) of the device 81. In another example configuration, the device 81 may comprise a laptop computer. The laptop computer may include a SIM, and various portions of the processing portion 83 and/or the memory portion 85 may be implemented on the SIM, on the laptop other than the SIM, or any combination thereof.

The processing portion 83, memory portion 85, and input/output portion 87 may be coupled together to allow communications therebetween. In various embodiments, the input/output portion 87 may comprise a receiver of the device 81, a transmitter of the device 81, or a combination thereof. The input/output portion 87 may be capable of receiving and/or providing information pertaining to telecommunications via a telecommunication network wherein management and control are based, at least in part, on user equipment, as described herein. In various configurations, the input/output portion 87 may receive and/or provide information via any appropriate means, such as, for example, optical means (e.g., infrared), electromagnetic means (e.g., RF, WI-FI, BLUETOOTH, ZIGBEE, etc.), acoustic means (e.g., speaker, microphone, ultrasonic receiver, ultrasonic transmitter), or a combination thereof.

The processing portion 83 may be capable of performing functions pertaining to telecommunications via a telecommunication network wherein management and control are based, at least in part, on user equipment, as described herein. In a basic configuration, the device 81 may include at least one memory portion 85. The memory portion 85 may comprise a storage medium having a concrete, tangible, physical structure. As is known, a signal does not have a concrete, tangible, physical structure. The memory portion 85, as well as any computer-readable storage medium described herein, is not to be construed as a signal. The memory portion 85, as well as any computer-readable storage medium described herein, is not to be construed as a transient signal. Further, the memory portion 85, as well as any computer-readable storage medium described herein, is not to be construed as a propagating signal. The memory portion 85, as well as any computer-readable storage medium described herein, is to be construed as an article of manufacture.

The memory portion 85 may store any information utilized in conjunction with telecommunications via a telecommunication network wherein management and control are based, at least in part, on user equipment, as described herein. Depending upon the exact configuration and type of processor, the memory portion 85 may be volatile (such as some types of RAM), non-volatile (such as ROM, flash memory, etc.), or a combination thereof. The mobile device 81 may include additional storage (e.g., removable storage and/or non-removable storage) including, but not limited to, tape, flash memory, smart cards, CD-ROM, digital versatile disks (DVD) or other optical storage, magnetic cassettes, magnetic tape, magnetic disk storage or other magnetic storage devices, universal serial bus (USB) compatible memory, or any other medium which can be used to store information and which can be accessed by the mobile device 81.

The device 81 also may contain a user interface (UI) portion 89 allowing a user to communicate with the device 81. The UI portion 89 may be capable of rendering any information utilized in conjunction with telecommunications via a telecommunication network wherein management and control are based, at least in part, on user equipment, as described herein. The UI portion 89 may provide the ability to control the device 81, via, for example, buttons, soft keys, voice actuated controls, a touch screen, movement of the mobile device 81, visual cues (e.g., moving a hand in front of a camera on the mobile device 81), or the like. The UI portion 89 may provide visual information (e.g., via a display), audio information (e.g., via speaker), mechanically (e.g., via a vibrating mechanism), or a combination thereof. In various configurations, the UI portion 89 may comprise a display, a touch screen, a keyboard, an accelerometer, a motion detector, a speaker, a microphone, a camera, a tilt sensor, or any combination thereof. The UI portion 89 may comprise means for inputting biometric information, such as, for example, fingerprint information, retinal information, voice information, and/or facial characteristic information.

The UI portion 89 may include a display for displaying multimedia such as, for example, application graphical user interfaces (GUIs), text, images, video, telephony functions such as Caller ID data, setup functions, menus, music, metadata, messages, wallpaper, graphics, Internet content, device status, preferences settings, map and location data, routes and other directions, points of interest (POI), and the like.

Figure 9:
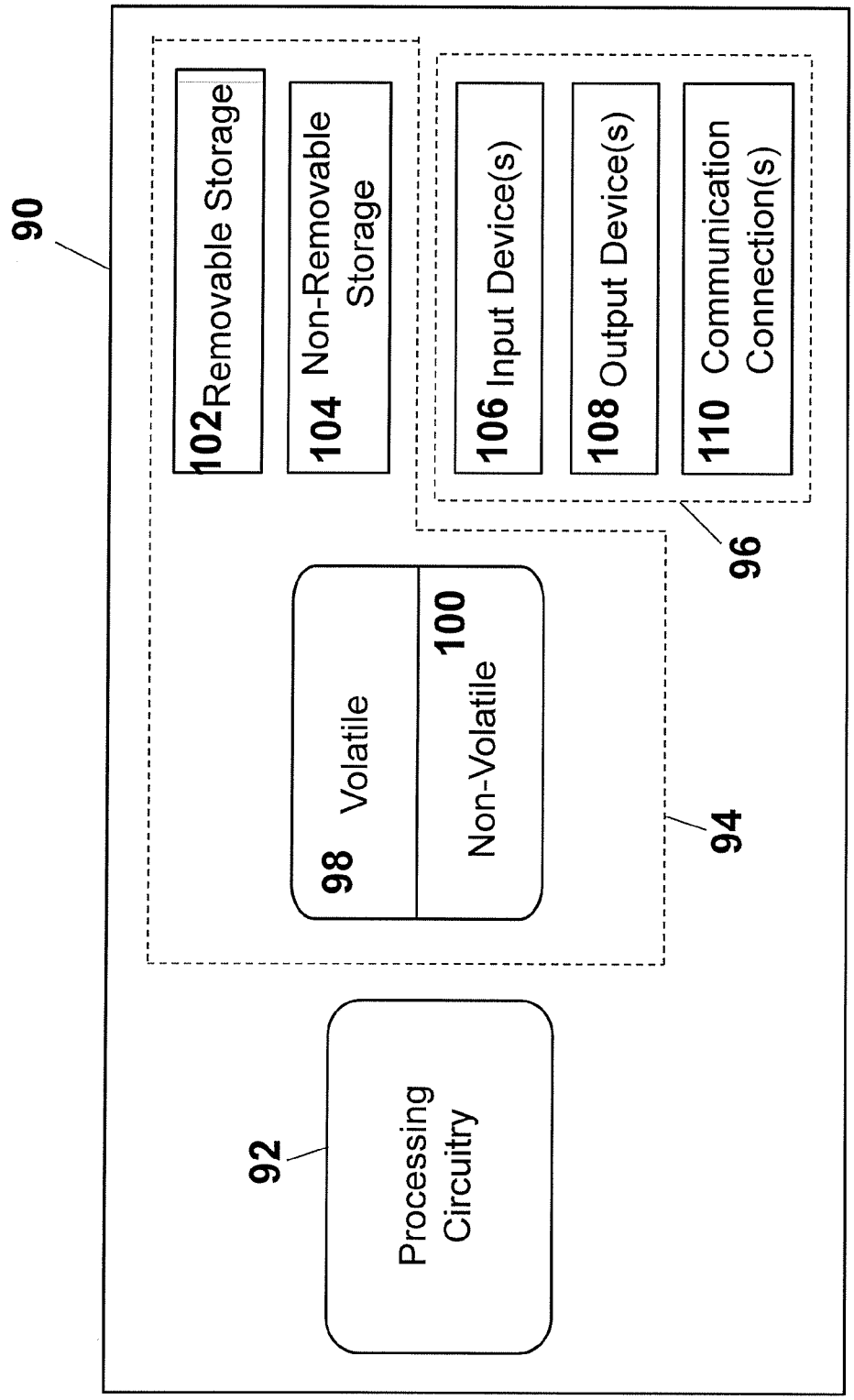
FIG. 9 is a block diagram of network entity of a telecommunication network wherein management and control are based, at least in part, on user equipment.

In FIG. 9 is a block diagram of network entity of a telecommunication network (e.g., telecommunications network 15) as described herein. The network entity 90 may comprise hardware or a combination of hardware and software. In an example embodiment, the functionality to facilitate telecommunications via a telecommunications network wherein management and control are based, at least in part, on user equipment, as described herein, may reside in any one or combination of network entities. The network entity 90 depicted in FIG. 9 may represent and perform functionality of any appropriate network entity, or combination of network entities, such as, for example, a component or various components of a cellular broadcast system wireless network, a processor, a server, a gateway, a node, a MSC, a SMSC, an ALFS, a GMLC, a RAN, a SMLC, or the like, or any appropriate combination thereof. It is emphasized that the block diagram depicted in FIG. 9 is exemplary and not intended to imply a specific implementation or configuration. Thus, the network entity 90 may be implemented in a single device or multiple devices (e.g., single server or multiple servers, single gateway or multiple gateways, single controller or multiple controllers, etc.). Multiple network entities may be distributed or centrally located. Multiple network entities may communicate wirelessly, via hard wire, or any appropriate combination thereof.

In an example embodiment, the network entity 90 may comprise a processor and memory coupled to the processor. The memory may comprise executable instructions that when executed by the processor cause the processor to effectuate operations associated with telecommunications via a telecommunications network wherein management and control are based, at least in part, on user equipment, as described herein. As evident from the herein description the network entity 90 is not to be construed as software per se.

In an example configuration, the network entity 90 may comprise a processing portion 92, a memory portion 94, and an input/output portion 96. The processing portion 92, memory portion 94, and input/output portion 96 may be coupled together (coupling not shown in FIG. 9) to allow communications therebetween. Each portion of the network entity 90 may comprise circuitry for performing functions associated with each respective portion. Thus, each portion may comprise hardware, or a combination of hardware and software. Accordingly, each portion of the network entity 90 is not to be construed as software per se. The input/output portion 96 may be capable of receiving and/or providing information from/to a communications device and/or other network entities configured for telecommunications via a telecommunications network wherein management and control are based, at least in part, on user equipment, as described herein. For example, the input/output portion 96 may include a wireless communications (e.g., 2.5G/3G/4G/GPS) card. The input/output portion 96 may be capable of receiving and/or sending video information, audio information, control information, image information, data, or any combination thereof. In an example embodiment, the input/output portion 96 may be capable of receiving and/or sending information to determine a location of the network entity 90 and/or the communications network entity 90. In an example configuration, the input\output portion 96 may comprise a GPS receiver. In an example configuration, the network entity 90 may determine its own geographical location and/or the geographical location of a communications device through any type of location determination system including, for example, the Global Positioning System (GPS), assisted GPS (A-GPS), time difference of arrival calculations, configured constant location (in the case of non-moving devices), any combination thereof, or any other appropriate means. In various configurations, the input/output portion 96 may receive and/or provide information via any appropriate means, such as, for example, optical means (e.g., infrared), electromagnetic means (e.g., RF, WI-FI, BLUETOOTH, ZIGBEE, etc.), acoustic means (e.g., speaker, microphone, ultrasonic receiver, ultrasonic transmitter), or a combination thereof. In an example configuration, the input/output portion may comprise a WIFI finder, a two way GPS chipset or equivalent, or the like, or a combination thereof.

The processing portion 92 may be capable of performing functions associated with telecommunications via a telecommunications network wherein management and control are based, at least in part, on user equipment, as described herein. For example, the processing portion 92 may be capable of, in conjunction with any other portion of the network entity 90, installing an application for telecommunications via a telecommunications network wherein management and control are based, at least in part, on user equipment, as described herein.

In a basic configuration, the network entity 90 may include at least one memory portion 94. The memory portion 94 may comprise a storage medium having a concrete, tangible, physical structure. As is known, a signal does not have a concrete, tangible, physical structure. The memory portion 94, as well as any computer-readable storage medium described herein, is not to be construed as a signal. The memory portion 94, as well as any computer-readable storage medium described herein, is not to be construed as a transient signal. The memory portion 94, as well as any computer-readable storage medium described herein, is not to be construed as a propagating signal. The memory portion 94, as well as any computer-readable storage medium described herein, is to be construed as an article of manufacture.

The memory portion 94 may store any information utilized in conjunction with telecommunications via a telecommunications network wherein management and control are based, at least in part, on user equipment, as described herein. Depending upon the exact configuration and type of processor, the memory portion 94 may be volatile 98 (such as some types of RAM), non-volatile 100 (such as ROM, flash memory, etc.), or a combination thereof. The network entity 90 may include additional storage (e.g., removable storage 102 and/or non-removable storage 104) including, for example, tape, flash memory, smart cards, CD-ROM, digital versatile disks (DVD) or other optical storage, magnetic cassettes, magnetic tape, magnetic disk storage or other magnetic storage devices, universal serial bus (USB) compatible memory, or any other medium which can be used to store information and which can be accessed by the network entity 90.

The network entity 90 also may contain communications connection(s) 110 that allow the network entity 90 to communicate with other devices, network entities, or the like. A communications connection(s) may comprise communication media. Communication media typically embody computer readable instructions, data structures, program modules or other data in a modulated data signal such as a carrier wave or other transport mechanism and includes any information delivery media. By way of example, and not limitation, communication media may include wired media such as a wired network or direct-wired connection, and wireless media such as acoustic, RF, infrared, and other wireless media. The term computer readable media as used herein includes both storage media and communication media. The network entity 90 also may include input device(s) 106 such as keyboard, mouse, pen, voice input device, touch input device, etc. Output device(s) 108 such as a display, speakers, printer, etc. also may be included.

A telecommunications network wherein management and control are based, at least in part, on user equipment, as described herein may replace other types of telecommunications networks. Some of which are described below.

Figure 10:
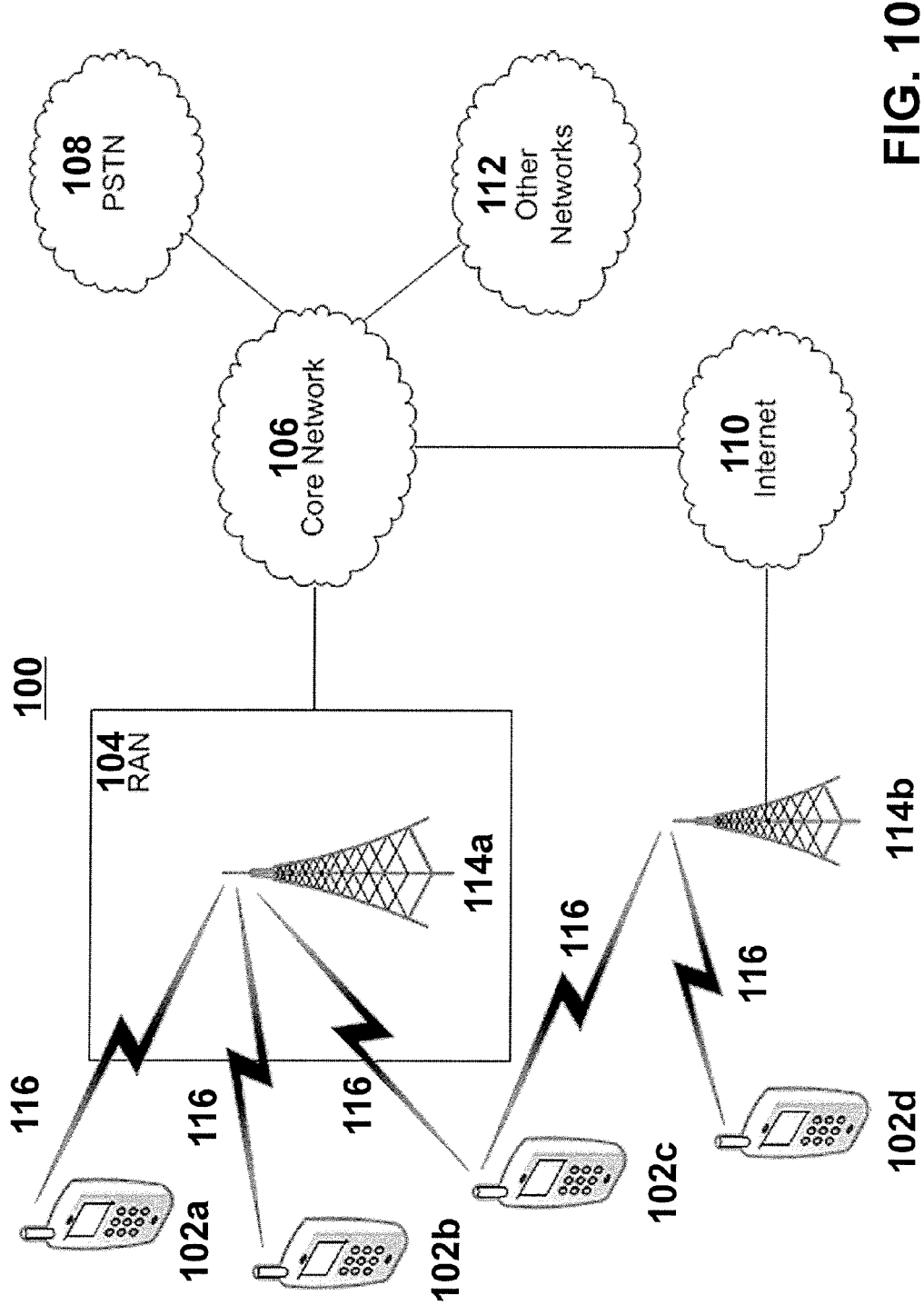
FIG. 10 is a diagram of an example communications system that may be replaced by a telecommunications system wherein management and control are based, at least in part, on user equipment.

FIG. 10 is a diagram of an example communications system as described herein. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. A communications system such as that shown in FIG. 10 may also be referred to herein as a network.

As shown in FIG. 10, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. For example, a WTRU may comprise network entity 12, network entity 26, a UE, or the like, or any combination thereof. By way of example, the WTRUs 102a, 102b, 102c, 102d may be configured to transmit and/or receive wireless signals and may include user equipment (UE), a mobile station, a mobile device, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in an embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA) that may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 10 may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 10, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 10, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 10 may be configured to communicate with the base station 114a, which may employ a cellular-based radio technology, and with the base station 114b, which may employ an IEEE 802 radio technology.

Figure 11:
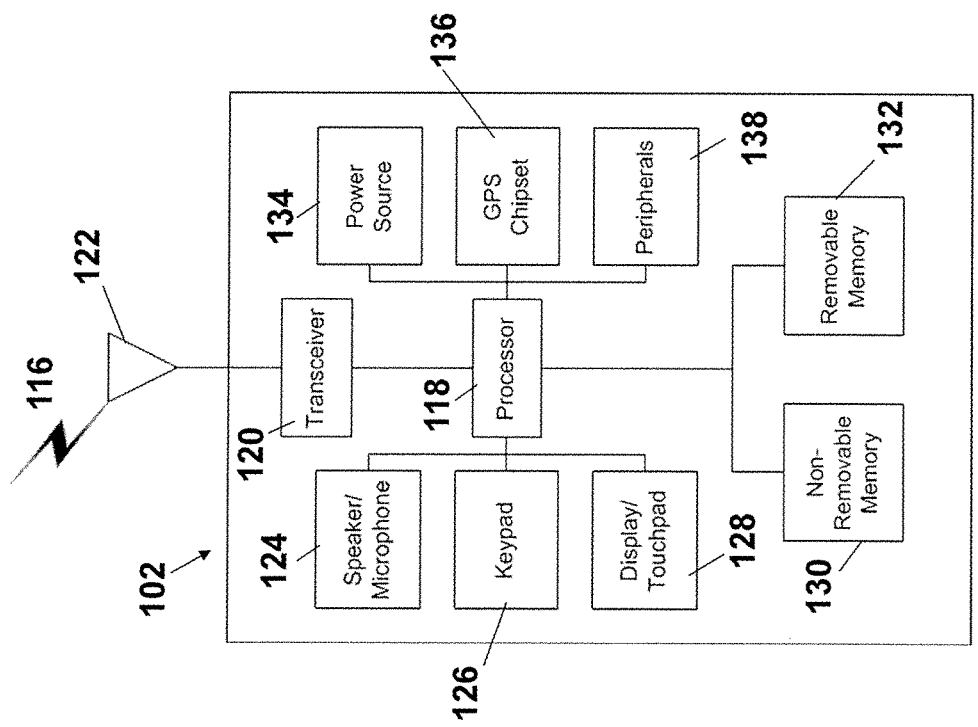
FIG. 11 is a system diagram of an example WTRU which may be utilized to facilitate telecommunications via a telecommunications system wherein management and control are based, at least in part, on user equipment.

FIG. 11 is a system diagram of an example WTRU 102 which may be utilized to facilitate telecommunications via a telecommunications system as described herein. As shown in FIG. 11, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 11 depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 11 as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 12:
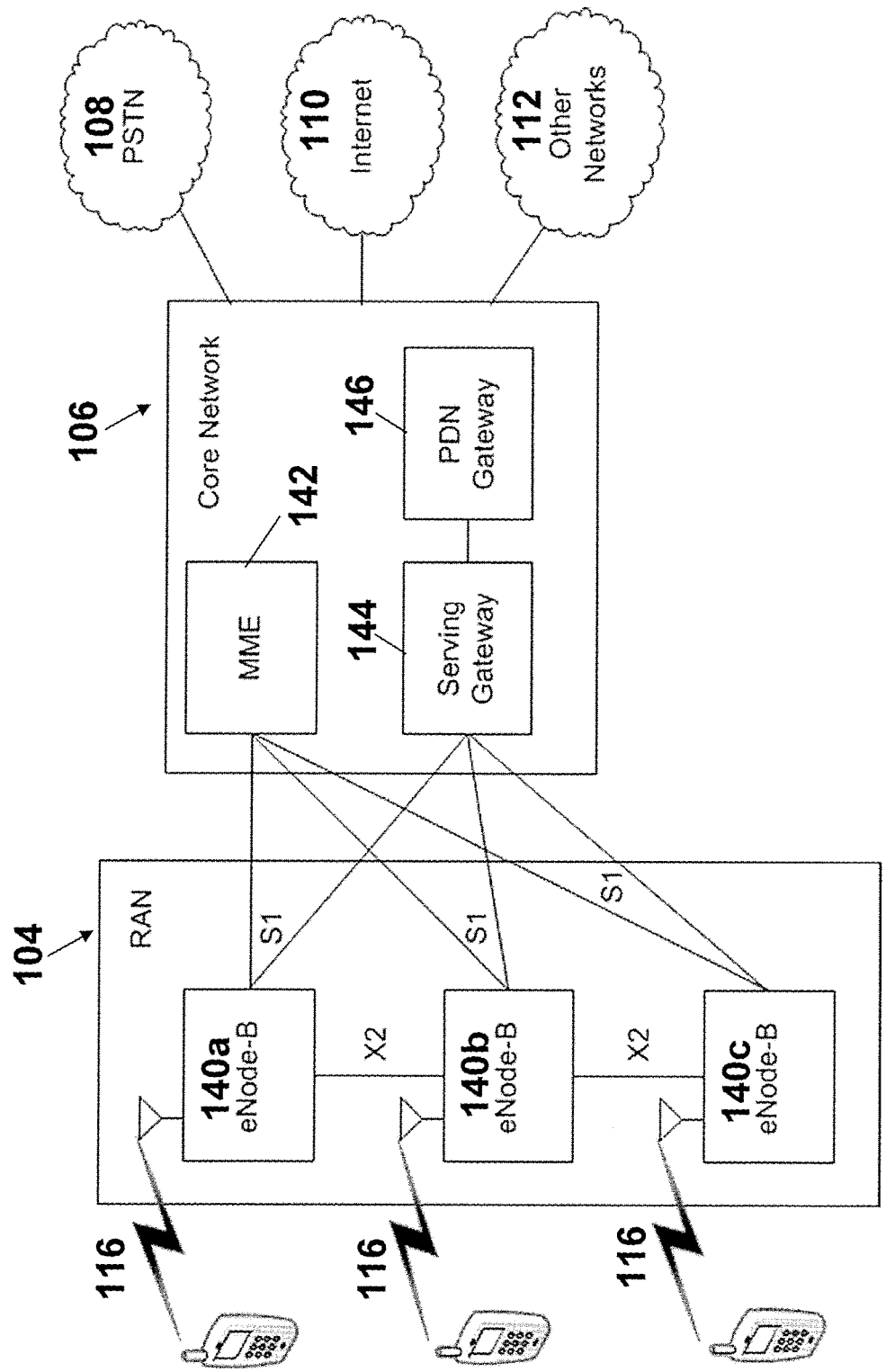
FIG. 12 is an example system diagram of RAN and a core network that may be replaced by a telecommunications system wherein management and control are based, at least in part, on user equipment.

FIG. 12 is an example system diagram of RAN 104 and a core network 106 that may be replaced by a telecommunications system wherein management and control are based, at least in part, on user equipment, as described herein. As noted above, the RAN 104 may employ an E-UTRA radio technology to communicate with the WTRUs 102a, 102b, and 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, and 140c may be associated with a particular cell (not shown) and may be configured to handle radio resource management decisions, handover decisions, scheduling of users in the uplink and/or downlink, and the like. As shown in FIG. 12, the eNode-Bs 140a, 140b, 140c may communicate with one another over an X2 interface.

The core network 106 shown in FIG. 12 may include a mobility management gateway or entity (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 140a, 140b, 140c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode-Bs 140a, 140b, and 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Figure 13:
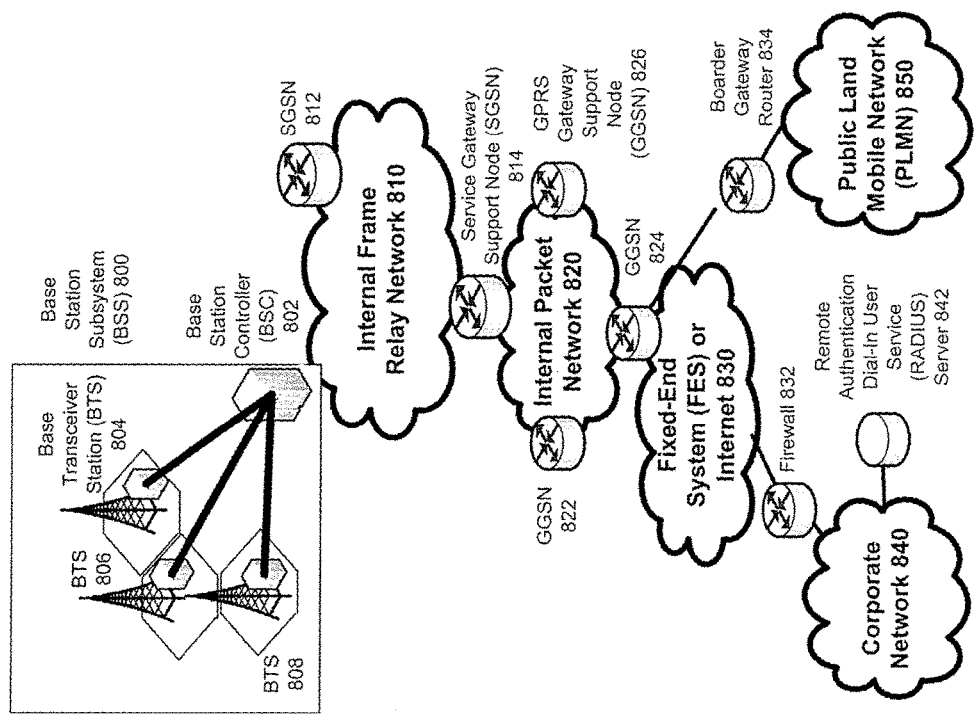
FIG. 13 depicts an overall block diagram of an example packet-based mobile cellular network environment, such as a GPRS network, that may be replaced by a telecommunications system wherein management and control are based, at least in part, on user equipment.

FIG. 13 depicts an overall block diagram of an example packet-based mobile cellular network environment, such as a GPRS network as described herein. In the example packet-based mobile cellular network environment shown in FIG. 13, there are a plurality of Base Station Subsystems ("BSS") 800 (only one is shown), each of which comprises a Base Station Controller ("BSC") 802 serving a plurality of Base Transceiver Stations ("BTS") such as BTSs 804, 806, and 808. BTSs 804, 806, 808, etc. are the access points where users of packet-based mobile devices become connected to the wireless network. In example fashion, the packet traffic originating from user devices is transported via an over-the-air interface to a BTS 808, and from the BTS 808 to the BSC 802. Base station subsystems, such as BSS 800, are a part of internal frame relay network 810 that can include Service GPRS Support Nodes ("SGSN") such as SGSN 812 and 814. Each SGSN is connected to an internal packet network 820 through which a SGSN 812, 814, etc. can route data packets to and from a plurality of gateway GPRS support nodes (GGSN) 822, 824, 826, etc. As illustrated, SGSN 814 and GGSNs 822, 824, and 826 are part of internal packet network 820. Gateway GPRS serving nodes 822, 824 and 826 mainly provide an interface to external Internet Protocol ("IP") networks such as Public Land Mobile Network ("PLMN") 850, corporate intranets 840, or Fixed-End System ("FES") or the public Internet 830. As illustrated, subscriber corporate network 840 may be connected to GGSN 824 via firewall 832; and PLMN 850 is connected to GGSN 824 via boarder gateway router 834. The Remote Authentication Dial-In User Service ("RADIUS") server 842 may be used for caller authentication when a user of a mobile cellular device calls corporate network 840.

Generally, there may be a several cell sizes in a GSM network, referred to as macro, micro, pico, femto and umbrella cells. The coverage area of each cell is different in different environments. Macro cells can be regarded as cells in which the base station antenna is installed in a mast or a building above average roof top level. Micro cells are cells whose antenna height is under average roof top level. Micro-cells are typically used in urban areas. Pico cells are small cells having a diameter of a few dozen meters. Pico cells are used mainly indoors. Femto cells have the same size as pico cells, but a smaller transport capacity. Femto cells are used indoors, in residential, or small business environments. On the other hand, umbrella cells are used to cover shadowed regions of smaller cells and fill in gaps in coverage between those cells.

Figure 14:
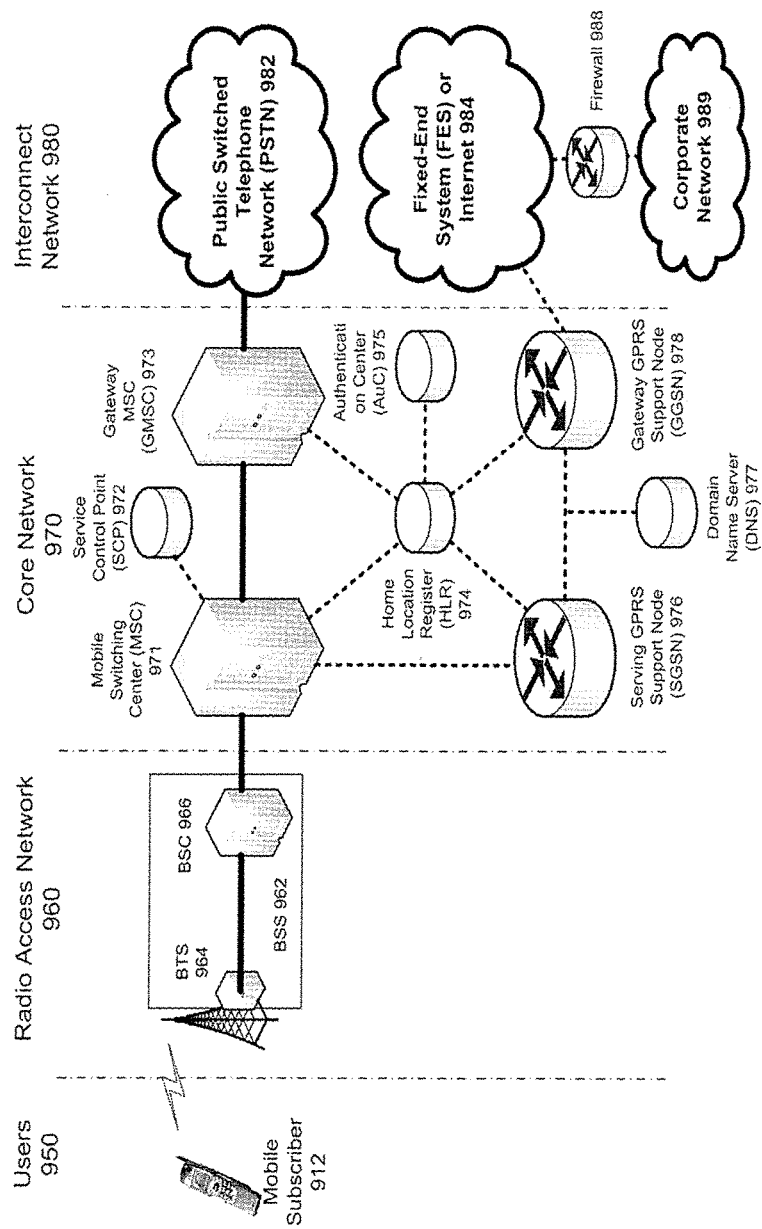
FIG. 14 illustrates an architecture of a typical GPRS network that may be replaced by a telecommunications system wherein management and control are based, at least in part, on user equipment.

FIG. 14 illustrates an architecture of a typical GPRS network as described herein. The architecture depicted in FIG. 14 may be segmented into four groups: users 950, radio access network 960, core network 970, and interconnect network 980. Users 950 comprise a plurality of end users. Note, device 912 is referred to as a mobile subscriber in the description of network shown in FIG. 14. In an example embodiment, the device depicted as mobile subscriber 912 comprises a communications device (e.g., communications device 160). Radio access network 960 comprises a plurality of base station subsystems such as BSSs 962, which include BTSs 964 and BSCs 966. Core network 970 comprises a host of various network elements. As illustrated in FIG. 14, core network 970 may comprise Mobile Switching Center ("MSC") 971, Service Control Point ("SCP") 972, gateway MSC 973, SGSN 976, Home Location Register ("HLR") 974, Authentication Center ("AuC") 975, Domain Name Server ("DNS") 977, and GGSN 978. Interconnect network 980 also comprises a host of various networks and other network elements. As illustrated in FIG. 14, interconnect network 980 comprises Public Switched Telephone Network ("PSTN") 982, Fixed-End System ("FES") or Internet 984, firewall 988, and Corporate Network 989.

A mobile switching center can be connected to a large number of base station controllers. At MSC 971, for instance, depending on the type of traffic, the traffic may be separated in that voice may be sent to Public Switched Telephone Network ("PSTN") 982 through Gateway MSC ("GMSC") 973, and/or data may be sent to SGSN 976, which then sends the data traffic to GGSN 978 for further forwarding.

When MSC 971 receives call traffic, for example, from BSC 966, it sends a query to a database hosted by SCP 972. The SCP 972 processes the request and issues a response to MSC 971 so that it may continue call processing as appropriate.

The HLR 974 is a centralized database for users to register to the GPRS network. HLR 974 stores static information about the subscribers such as the International Mobile Subscriber Identity ("IMSI"), subscribed services, and a key for authenticating the subscriber. HLR 974 also stores dynamic subscriber information such as the current location of the mobile subscriber. Associated with HLR 974 is AuC 975. AuC 975 is a database that contains the algorithms for authenticating subscribers and includes the associated keys for encryption to safeguard the user input for authentication.

In the following, depending on context, the term "mobile subscriber" sometimes refers to the end user and sometimes to the actual portable device, such as a mobile device, used by an end user of the mobile cellular service. When a mobile subscriber turns on his or her mobile device, the mobile device goes through an attach process by which the mobile device attaches to an SGSN of the GPRS network. In FIG. 14, when mobile subscriber 912 initiates the attach process by turning on the network capabilities of the mobile device, an attach request is sent by mobile subscriber 912 to SGSN 976. The SGSN 976 queries another SGSN, to which mobile subscriber 912 was attached before, for the identity of mobile subscriber 912. Upon receiving the identity of mobile subscriber 912 from the other SGSN, SGSN 976 requests more information from mobile subscriber 912. This information is used to authenticate mobile subscriber 912 to SGSN 976 by HLR 974. Once verified, SGSN 976 sends a location update to HLR 974 indicating the change of location to a new SGSN, in this case SGSN 976. HLR 974 notifies the old SGSN, to which mobile subscriber 912 was attached before, to cancel the location process for mobile subscriber 912. HLR 974 then notifies SGSN 976 that the location update has been performed. At this time, SGSN 976 sends an Attach Accept message to mobile subscriber 912, which in turn sends an Attach Complete message to SGSN 976.

After attaching itself with the network, mobile subscriber 912 then goes through the authentication process. In the authentication process, SGSN 976 sends the authentication information to HLR 974, which sends information back to SGSN 976 based on the user profile that was part of the user's initial setup. The SGSN 976 then sends a request for authentication and ciphering to mobile subscriber 912. The mobile subscriber 912 uses an algorithm to send the user identification (ID) and password to SGSN 976. The SGSN 976 uses the same algorithm and compares the result. If a match occurs, SGSN 976 authenticates mobile subscriber 912.

Next, the mobile subscriber 912 establishes a user session with the destination network, corporate network 989, by going through a Packet Data Protocol ("PDP") activation process. Briefly, in the process, mobile subscriber 912 requests access to the Access Point Name ("APN"), for example, UPS.com, and SGSN 976 receives the activation request from mobile subscriber 912. SGSN 976 then initiates a Domain Name Service ("DNS") query to learn which GGSN node has access to the UPS.com APN. The DNS query is sent to the DNS server within the core network 970, such as DNS 977, which is provisioned to map to one or more GGSN nodes in the core network 970. Based on the APN, the mapped GGSN 978 can access the requested corporate network 989. The SGSN 976 then sends to GGSN 978 a Create Packet Data Protocol ("PDP") Context Request message that contains necessary information. The GGSN 978 sends a Create PDP Context Response message to SGSN 976, which then sends an Activate PDP Context Accept message to mobile subscriber 912.

Once activated, data packets of the call made by mobile subscriber 912 can then go through radio access network 960, core network 970, and interconnect network 980, in a particular fixed-end system or Internet 984 and firewall 988, to reach corporate network 989.

Figure 15:
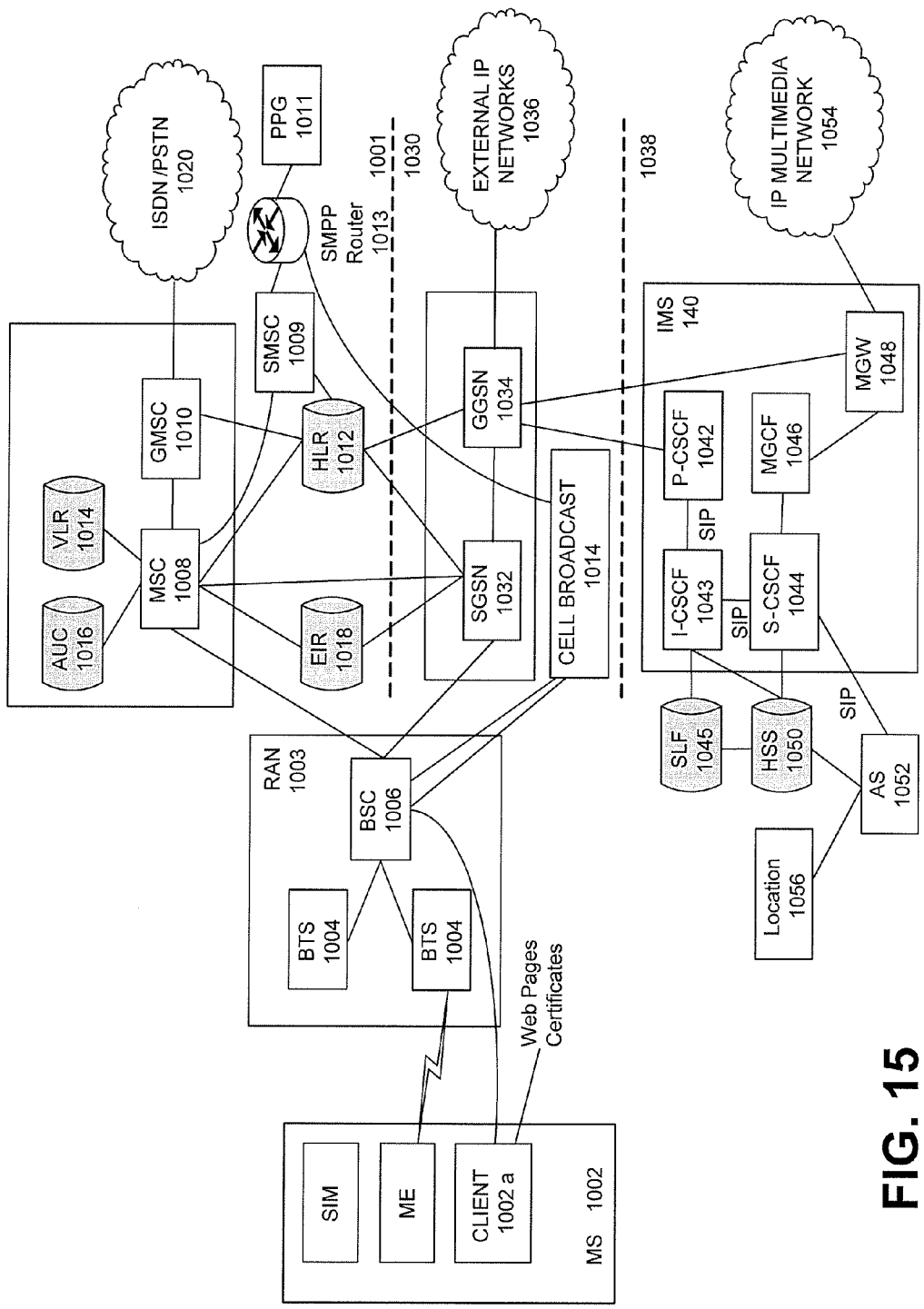
FIG. 15 illustrates an example block diagram view of a GSM/GPRS/IP multimedia network architecture that may be replaced by a telecommunications system wherein management and control are based, at least in part, on user equipment.

FIG. 15 illustrates an example block diagram view of a GSM/GPRS/IP multimedia network architecture as described herein. As illustrated, the architecture of FIG. 15 includes a GSM core network 1001, a GPRS network 1030 and an IP multimedia network 1038. The GSM core network 1001 includes a Mobile Station (MS) 1002, at least one Base Transceiver Station (BTS) 1004 and a Base Station Controller (BSC) 1006. The MS 1002 is physical equipment or Mobile Equipment (ME), such as a mobile phone or a laptop computer that is used by mobile subscribers, with a Subscriber identity Module (SIM) or a Universal Integrated Circuit Card (UICC). The SIM or UICC includes an International Mobile Subscriber Identity (IMSI), which is a unique identifier of a subscriber. The BTS 1004 is physical equipment, such as a radio tower, that enables a radio interface to communicate with the MS. Each BTS may serve more than one MS. The BSC 1006 manages radio resources, including the BTS. The BSC may be connected to several BTSs. The BSC and BTS components, in combination, are generally referred to as a base station (BSS) or radio access network (RAN) 1003.

The GSM core network 1001 also includes a Mobile Switching Center (MSC) 1008, a Gateway Mobile Switching Center (GMSC) 1010, a Home Location Register (HLR) 1012, Visitor Location Register (VLR) 1014, an Authentication Center (AuC) 1018, and an Equipment Identity Register (EIR) 1016. The MSC 1008 performs a switching function for the network. The MSC also performs other functions, such as registration, authentication, location updating, handovers, and call routing. The GMSC 1010 provides a gateway between the GSM network and other networks, such as an Integrated Services Digital Network (ISDN) or Public Switched Telephone Networks (PSTNs) 1020. Thus, the GMSC 1010 provides interworking functionality with external networks.

The HLR 1012 is a database that contains administrative information regarding each subscriber registered in a corresponding GSM network. The HLR 1012 also contains the current location of each MS. The VLR 1014 is a database that contains selected administrative information from the HLR 1012. The VLR contains information necessary for call control and provision of subscribed services for each MS currently located in a geographical area controlled by the VLR. The HLR 1012 and the VLR 1014, together with the MSC 1008, provide the call routing and roaming capabilities of GSM. The AuC 1016 provides the parameters needed for authentication and encryption functions. Such parameters allow verification of a subscriber's identity. The EIR 1018 stores security-sensitive information about the mobile equipment.

A Short Message Service Center (SMSC) 1009 allows one-to-one Short Message Service (SMS) messages to be sent to/from the MS 1002. A Push Proxy Gateway (PPG) 1011 is used to "push" (i.e., send without a synchronous request) content to the MS 1002. The PPG 1011 acts as a proxy between wired and wireless networks to facilitate pushing of data to the MS 1002. A Short Message Peer to Peer (SMPP) protocol router 1013 is provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 1002 sends a location update including its current location information to the MSC/VLR, via the BTS 1004 and the BSC 1006. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 1030 is logically implemented on the GSM core network architecture by introducing two packet-switching network nodes, a serving GPRS support node (SGSN) 1032, a cell broadcast and a Gateway GPRS support node (GGSN) 1034. The SGSN 1032 is at the same hierarchical level as the MSC 1008 in the GSM network. The SGSN controls the connection between the GPRS network and the MS 1002. The SGSN also keeps track of individual MS's locations and security functions and access controls.

A Cell Broadcast Center (CBC) 14 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 1034 provides a gateway between the GPRS network and a public packet network (PDN) or other IP networks 1036. That is, the GGSN provides interworking functionality with external networks, and sets up a logical link to the MS through the SGSN. When packet-switched data leaves the GPRS network, it is transferred to an external TCP-IP network 1036, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one of three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time.

A class B MS can attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

A GPRS network 1030 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how to signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not receive pages from a circuit switched domain when engaged in a data call, since the MS is receiving data and is not listening to a paging channel. In a NOM3 network, a MS can monitor pages for a circuit switched network while received data and vice versa.

The IP multimedia network 1038 was introduced with 3GPP Release 5, and includes an IP multimedia subsystem (IMS) 1040 to provide rich multimedia services to end users. A representative set of the network entities within the IMS 1040 are a call/session control function (CSCF), a media gateway control function (MGCF) 1046, a media gateway (MGW) 1048, and a master subscriber database, called a home subscriber server (HSS) 1050. The HSS 1050 may be common to the GSM network 1001, the GPRS network 1030 as well as the IP multimedia network 1038.

The IP multimedia system 1040 is built around the call/session control function, of which there are three types: an interrogating CSCF (I-CSCF) 1043, a proxy CSCF (P-CSCF) 1042, and a serving CSCF (S-CSCF) 1044. The P-CSCF 1042 is the MS's first point of contact with the IMS 1040. The P-CSCF 1042 forwards session initiation protocol (SIP) messages received from the MS to an SIP server in a home network (and vice versa) of the MS. The P-CSCF 1042 may also modify an outgoing request according to a set of rules defined by the network operator (for example, address analysis and potential modification).

The I-CSCF 1043, forms an entrance to a home network and hides the inner topology of the home network from other networks and provides flexibility for selecting an S-CSCF. The I-CSCF 1043 may contact a subscriber location function (SLF) 1045 to determine which HSS 1050 to use for the particular subscriber, if multiple HSS's 1050 are present. The S-CSCF 1044 performs the session control services for the MS 1002. This includes routing originating sessions to external networks and routing terminating sessions to visited networks. The S-CSCF 1044 also decides whether an application server (AS) 1052 is required to receive information on an incoming SIP session request to ensure appropriate service handling. This decision is based on information received from the HSS 1050 (or other sources, such as an application server 1052). The AS 1052 also communicates to a location server 1056 (e.g., a Gateway Mobile Location Center (GMLC)) that provides a position (e.g., latitude/longitude coordinates) of the MS 1002.

The HSS 1050 contains a subscriber profile and keeps track of which core network node is currently handling the subscriber. It also supports subscriber authentication and authorization functions (AAA). In networks with more than one HSS 1050, a subscriber location function provides information on the HSS 1050 that contains the profile of a given subscriber.

The MGCF 1046 provides interworking functionality between SIP session control signaling from the IMS 1040 and ISUP/BICC call control signaling from the external GSTN networks (not shown). It also controls the media gateway (MGW) 1048 that provides user-plane interworking functionality (e.g., converting between AMR- and PCM-coded voice). The MGW 1048 also communicates with other IP multimedia networks 1054.

Push to Talk over Cellular (PoC) capable mobile phones register with the wireless network when the phones are in a predefined area (e.g., job site, etc.). When the mobile phones leave the area, they register with the network in their new location as being outside the predefined area. This registration, however, does not indicate the actual physical location of the mobile phones outside the pre-defined area.

Figure 16:
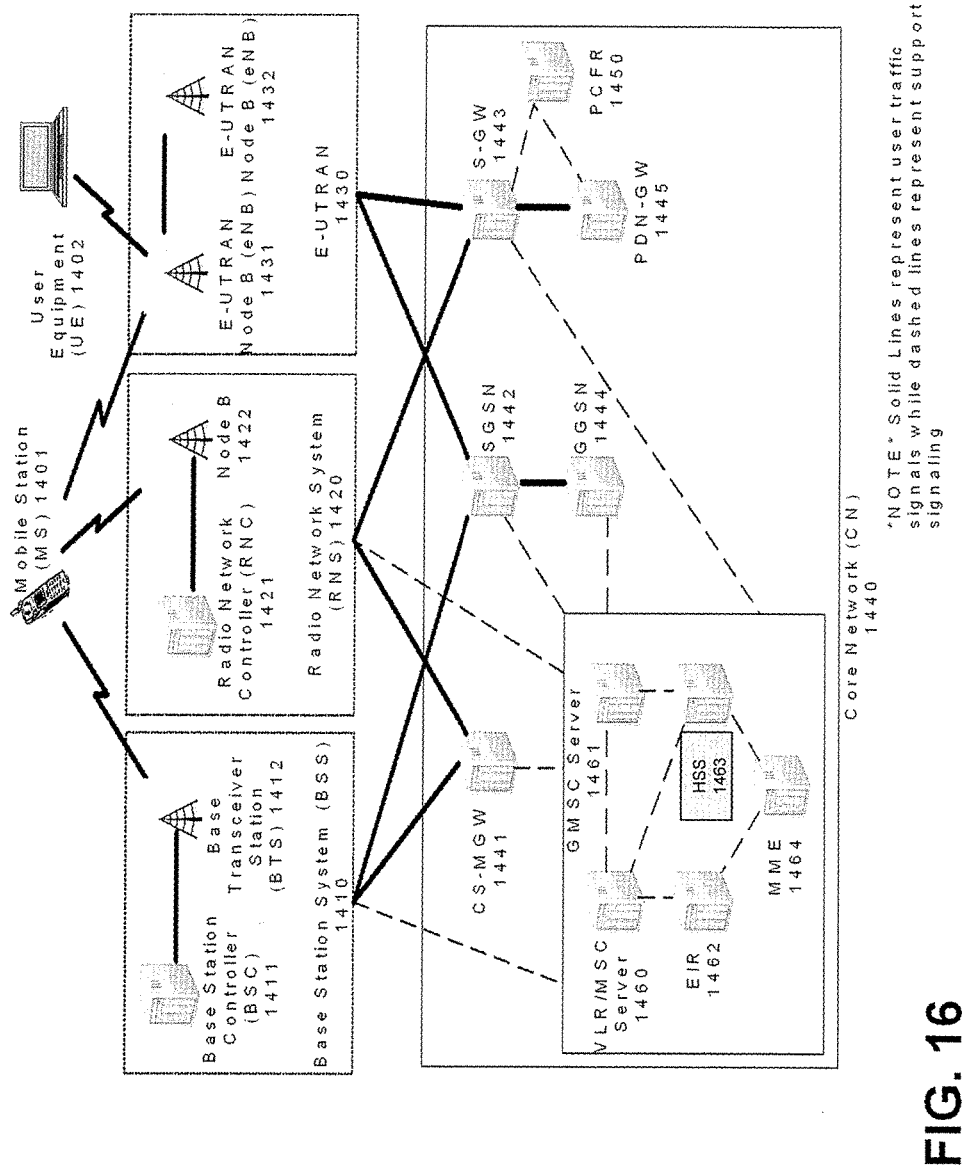
FIG. 16 illustrates a PLMN block diagram view of an example architecture that may be replaced by a telecommunications system wherein management and control are based, at least in part, on user equipment.

FIG. 16 illustrates a PLMN block diagram view of an example architecture that may be replaced by a telecommunications system wherein management and control are based, at least in part, on user equipment, as described herein. Mobile Station (MS) 1401 is the physical equipment used by the PLMN subscriber. In one illustrative embodiment, communications device 200 may serve as Mobile Station 1401. Mobile Station 1401 may be one of, but not limited to, a cellular telephone, a cellular telephone in combination with another electronic device or any other wireless mobile communication device.

Mobile Station 1401 may communicate wirelessly with Base Station System (BSS) 1410. BSS 1410 contains a Base Station Controller (BSC) 1411 and a Base Transceiver Station (BTS) 1412. BSS 1410 may include a single BSC 1411/BTS 1412 pair (Base Station) or a system of BSC/BTS pairs which are part of a larger network. BSS 1410 is responsible for communicating with Mobile Station 1401 and may support one or more cells. BSS 1410 is responsible for handling cellular traffic and signaling between Mobile Station 1401 and Core Network 1440. Typically, BSS 1410 performs functions that include, but are not limited to, digital conversion of speech channels, allocation of channels to mobile devices, paging, and transmission/reception of cellular signals.

Additionally, Mobile Station 1401 may communicate wirelessly with Radio Network System (RNS) 1420. RNS 1420 contains a Radio Network Controller (RNC) 1421 and one or more Node(s) B 1422. RNS 1420 may support one or more cells. RNS 1420 may also include one or more RNC 1421/Node B 1422 pairs or alternatively a single RNC 1421 may manage multiple Nodes B 1422. RNS 1420 is responsible for communicating with Mobile Station 1401 in its geographically defined area. RNC 1421 is responsible for controlling the Node(s) B 1422 that are connected to it and is a control element in a UMTS radio access network. RNC 1421 performs functions such as, but not limited to, load control, packet scheduling, handover control, security functions, as well as controlling Mobile Station 1401's access to the Core Network (CN) 1440.

The evolved UMTS Terrestrial Radio Access Network (E-UTRAN) 1430 is a radio access network that provides wireless data communications for Mobile Station 1401 and User Equipment 1402. E-UTRAN 1430 provides higher data rates than traditional UMTS. It is part of the Long Term Evolution (LTE) upgrade for mobile networks and later releases meet the requirements of the International Mobile Telecommunications (IMT) Advanced and are commonly known as a 4G networks. E-UTRAN 1430 may include of series of logical network components such as E-UTRAN Node B (eNB) 1431 and E-UTRAN Node B (eNB) 1432. E-UTRAN 1430 may contain one or more eNBs. User Equipment 1402 may be any user device capable of connecting to E-UTRAN 1430 including, but not limited to, a personal computer, laptop, mobile device, wireless router, or other device capable of wireless connectivity to E-UTRAN 1430. The improved performance of the E-UTRAN 1430 relative to a typical UMTS network allows for increased bandwidth, spectral efficiency, and functionality including, but not limited to, voice, high-speed applications, large data transfer and IPTV, while still allowing for full mobility.

An example embodiment of a mobile data and communication service that may be implemented in the PLMN architecture described in FIG. 16 is the Enhanced Data rates for GSM Evolution (EDGE). EDGE is an enhancement for GPRS networks that implements an improved signal modulation scheme known as 8-PSK (Phase Shift Keying). By increasing network utilization, EDGE may achieve up to three times faster data rates as compared to a typical GPRS network. EDGE may be implemented on any GSM network capable of hosting a GPRS network, making it an ideal upgrade over GPRS since it may provide increased functionality of existing network resources. Evolved EDGE networks are becoming standardized in later releases of the radio telecommunication standards, which provide for even greater efficiency and peak data rates of up to 1 Mbit/s, while still allowing implementation on existing GPRS-capable network infrastructure.

Typically Mobile Station 1401 may communicate with any or all of BSS 1410, RNS 1420, or E-UTRAN 1430. In a illustrative system, each of BSS 1410, RNS 1420, and E-UTRAN 1430 may provide Mobile Station 1401 with access to Core Network 1440. The Core Network 1440 may include of a series of devices that route data and communications between end users. Core Network 1440 may provide network service functions to users in the Circuit Switched (CS) domain, the Packet Switched (PS) domain or both. The CS domain refers to connections in which dedicated network resources are allocated at the time of connection establishment and then released when the connection is terminated. The PS domain refers to communications and data transfers that make use of autonomous groupings of bits called packets. Each packet may be routed, manipulated, processed or handled independently of all other packets in the PS domain and does not require dedicated network resources.

The Circuit Switched—Media Gateway Function (CS-MGW) 1441 is part of Core Network 1440, and interacts with Visitor Location Register (VLR) and Mobile-Services Switching Center (MSC) Server 1460 and Gateway MSC Server 1461 in order to facilitate Core Network 1440 resource control in the CS domain. Functions of CS-MGW 1441 include, but are not limited to, media conversion, bearer control, payload processing and other mobile network processing such as handover or anchoring. CS-MGW 1440 may receive connections to Mobile Station 1401 through BSS 1410, RNS 1420 or both.

Serving GPRS Support Node (SGSN) 1442 stores subscriber data regarding Mobile Station 1401 in order to facilitate network functionality. SGSN 1442 may store subscription information such as, but not limited to, the International Mobile Subscriber Identity (IMSI), temporary identities, or Packet Data Protocol (PDP) addresses. SGSN 1442 may also store location information such as, but not limited to, the Gateway GPRS Support Node (GGSN) 1444 address for each GGSN where an active PDP exists. GGSN 1444 may implement a location register function to store subscriber data it receives from SGSN 1442 such as subscription or location information.

Serving Gateway (S-GW) 1443 is an interface which provides connectivity between E-UTRAN 1430 and Core Network 1440. Functions of S-GW 1443 include, but are not limited to, packet routing, packet forwarding, transport level packet processing, event reporting to Policy and Charging Rules Function (PCRF) 1450, and mobility anchoring for inter-network mobility. PCRF 1450 uses information gathered from S-GW 1443, as well as other sources, to make applicable policy and charging decisions related to data flows, network resources and other network administration functions. Packet Data Network Gateway (PDN-GW) 1445 may provide user-to-services connectivity functionality including, but not limited to, network-wide mobility anchoring, bearer session anchoring and control, and IP address allocation for PS domain connections.

Home Subscriber Server (HSS) 1463 is a database for user information, and stores subscription data regarding Mobile Station 1401 or User Equipment 1402 for handling calls or data sessions. Networks may contain one HSS 1463 or more if additional resources are required. Example data stored by HSS 1463 include, but is not limited to, user identification, numbering and addressing information, security information, or location information. HSS 1463 may also provide call or session establishment procedures in both the PS and CS domains.

The VLR/MSC Server 1460 provides user location functionality. When Mobile Station 1401 enters a new network location, it begins a registration procedure. A MSC Server for that location transfers the location information to the VLR for the area. A VLR and MSC Server may be located in the same computing environment, as is shown by VLR/MSC Server 1460, or alternatively may be located in separate computing environments. A VLR may contain, but is not limited to, user information such as the IMSI, the Temporary Mobile Station Identity (TMSI), the Local Mobile Station Identity (LMSI), the last known location of the mobile station, or the SGSN where the mobile station was previously registered. The MSC server may contain information such as, but not limited to, procedures for Mobile Station 1401 registration or procedures for handover of Mobile Station 1401 to a different section of the Core Network 1440. GMSC Server 1461 may serve as a connection to alternate GMSC Servers for other mobile stations in larger networks.

Equipment Identity Register (EIR) 1462 is a logical element which may store the International Mobile Equipment Identities (IMEI) for Mobile Station 1401. In a typical embodiment, user equipment may be classified as either "white listed" or "black listed" depending on its status in the network. In one embodiment, if Mobile Station 1401 is stolen and put to use by an unauthorized user, it may be registered as "black listed" in EIR 1462, preventing its use on the network. Mobility Management Entity (MME) 1464 is a control node which may track Mobile Station 1401 or User Equipment 1402 if the devices are idle. Additional functionality may include the ability of MME 1464 to contact an idle Mobile Station 1401 or User Equipment 1402 if retransmission of a previous session is required.

As described herein, a telecommunications system wherein management and control utilizing a software designed network (SDN) and a simple Internet protocol are based, at least in part, on user equipment, may provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on UE types to reduce network cost and allow massive scale; shortening cycle time and improving network upgradability; flexibility in creating end-to-end services based on types of UEs and applications, thus improve customer experience; and improving UE power efficiency and battery life—especially for simple M2M devices—through enhanced wireless management.

While example embodiments of a telecommunications system in which e911 calls may be handed-off between 3GPP networks and non-3GPP networks and vice versa have been described in connection with various computing devices/processors, the underlying concepts may be applied to any computing device, processor, or system capable of facilitating a telecommunications system wherein management and control are based, at least in part, on user equipment. The various techniques described herein may be implemented in connection with hardware or software or, where appropriate, with a combination of both. Thus, the methods and apparatuses of a telecommunications system wherein management and control are based, at least in part, on user equipment, or certain aspects or portions thereof, may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes an apparatus for telecommunications via a telecommunications system wherein management and control are based, at least in part, on user equipment as described herein. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. The language can be a compiled or interpreted language, and combined with hardware implementations.

The methods and apparatuses associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for implementing a telecommunications system wherein management and control are based, at least in part, on user equipment as described herein. When implemented on a general-purpose processor, the program code combines with the processor to provide a unique apparatus that operates to invoke the functionality of a telecommunications system wherein management and control are based, at least in part, on user equipment as described herein.

While a telecommunications system has been described in connection with the various embodiments of the various figures, it is to be understood that other similar embodiments may be used or modifications and additions may be made to the described embodiments of a telecommunications system wherein management and control are based, at least in part, on user equipment without deviating therefrom. For example, one skilled in the art will recognize that a telecommunications system wherein management and control are based, at least in part, on user equipment as described in the instant application may apply to any environment, whether wired or wireless, and may be applied to any number of such devices connected via a communications network and interacting across the network. Therefore, a telecommunications system wherein management and control are based, at least in part, on user equipment as described herein should not be limited to any single embodiment, but rather should be construed in breadth and scope in accordance with the appended claims.

What is claimed:

1. A telecommunications system comprising:
   a controller; and
   memory coupled to the controller, the memory comprising executable instructions that when executed by the controller cause the controller to effectuate operations comprising:
      connecting an emergency communication between a mobile device and an emergency service;
      receiving, from a home subscriber service server, information comprising an identity of a packet data network gateway, wherein the identity of the packet data network gateway is stored on the home subscriber service server subsequent to the mobile device initiating the emergency communication in a first network;
      receiving, from the mobile device, an indication to handoff the emergency communication from the first network to a second network, wherein the indication to handoff the emergency communication, includes a bit set to allow reallocation of an existing internet protocol prefix used by the mobile device to access internet protocol multimedia subsystem services;
      responsive to receiving the indication to handoff the emergency communication, determining the packet data network gateway based on the information received from the home subscriber service server; and
      transferring the emergency communication from the first network to the second network while maintaining continuity of the emergency communication.

2. The system of claim 1, wherein the first network is a non-3GPP network and the second network is a 3GPP network.

3. The system of claim 2, wherein the connecting step includes receiving an attach request with an emergency handoff command from the mobile device.

4. The system of claim 3, wherein the transferring step further comprises:
   receiving an attach request to a 3GPP network from the mobile device;
   creating a second bearer in the 3GPP network; and
   transferring the emergency communication to the created bearers.

5. The system of claim 1, wherein the first network is a 3GPP network and the second network is a non-3GPP network.

6. The system of claim 5 wherein the connecting step includes a request type indicating emergency.

7. The system of claim 1 wherein the transferring step further comprises:
retrieving updated packet gateway identification;
selecting a packet gateway based on the retrieving step;
creating a second bearer; and
transferring the emergency communication to the second bearer.

8. A method comprising:
connecting an emergency communication between a mobile device and an emergency service;
receiving, from a home subscriber service server, information comprising an identity of a packet data network gateway, wherein the identity of the packet data network gateway is stored on the home subscriber service server subsequent to the mobile device initiating the emergency communication in a first network;
receiving, from the mobile device, an indication to handoff the emergency communication from the first network to a second network, wherein the indication to handoff the emergency communication, includes a bit set to allow reallocation of an existing internet protocol prefix used by the mobile device to access internet protocol multimedia subsystem services;
responsive to receiving the indication to handoff the emergency communication, determining the packet data network gateway based on the information received from the home subscriber service server; and
transferring the emergency communication from the first network to the second network while maintaining continuity of the emergency communication.

9. The method of claim 8, wherein the first network is a non-3GPP network and the second network is a 3GPP network.

10. The method of claim 9, wherein the connecting step includes receiving an attach request with handoff command from the mobile device.

11. The method of claim 10, wherein the transferring step further comprises:
receiving an attach request to a 3GPP network from the mobile device;
creating a second bearer in the 3GPP network; and
transferring the emergency communication to the created bearers.

12. The method of claim 8, wherein the first network is a 3GPP network and the second network is a non-3GPP network.

13. The method of claim 12 wherein the connecting step includes a request type indicating emergency.

14. The method of claim 8 wherein the transferring step further comprises:
retrieving updated packet gateway identification;
selecting a packet gateway based on the retrieving step;
creating a second bearer; and
transferring the emergency communication to the second bearer.

* * * * *